W. R. GREEN.
TIRE CARRIER.
APPLICATION FILED JULY 7, 1919.
1,375,753.
Patented Apr. 26, 1921.
3 SHEETS—SHEET 1.
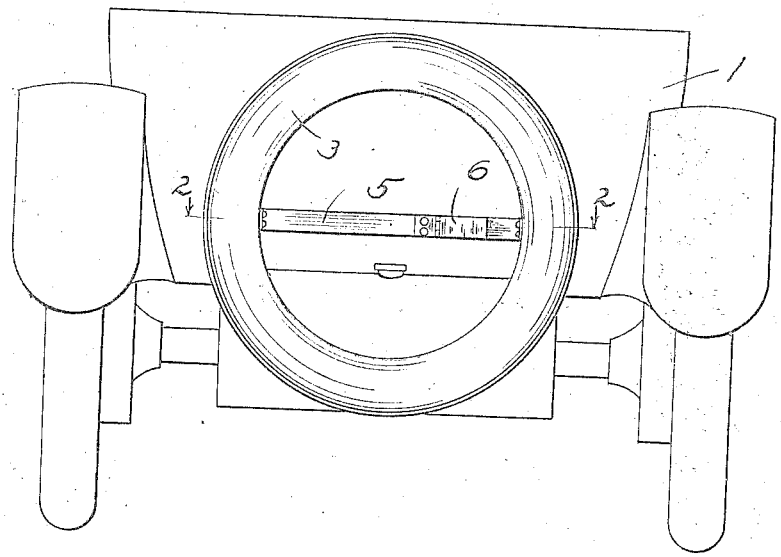
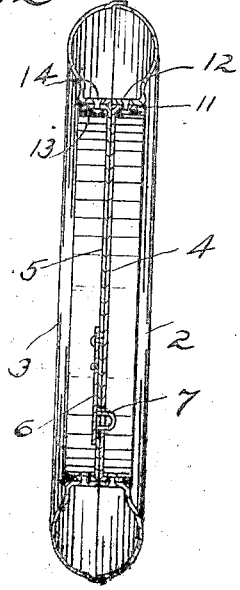
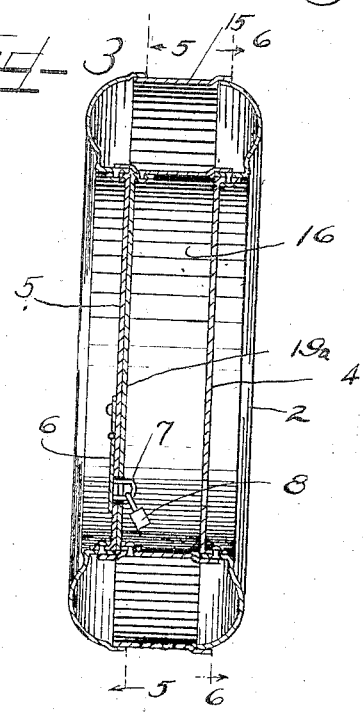
Witnesses
Inventor
Walter R. Green

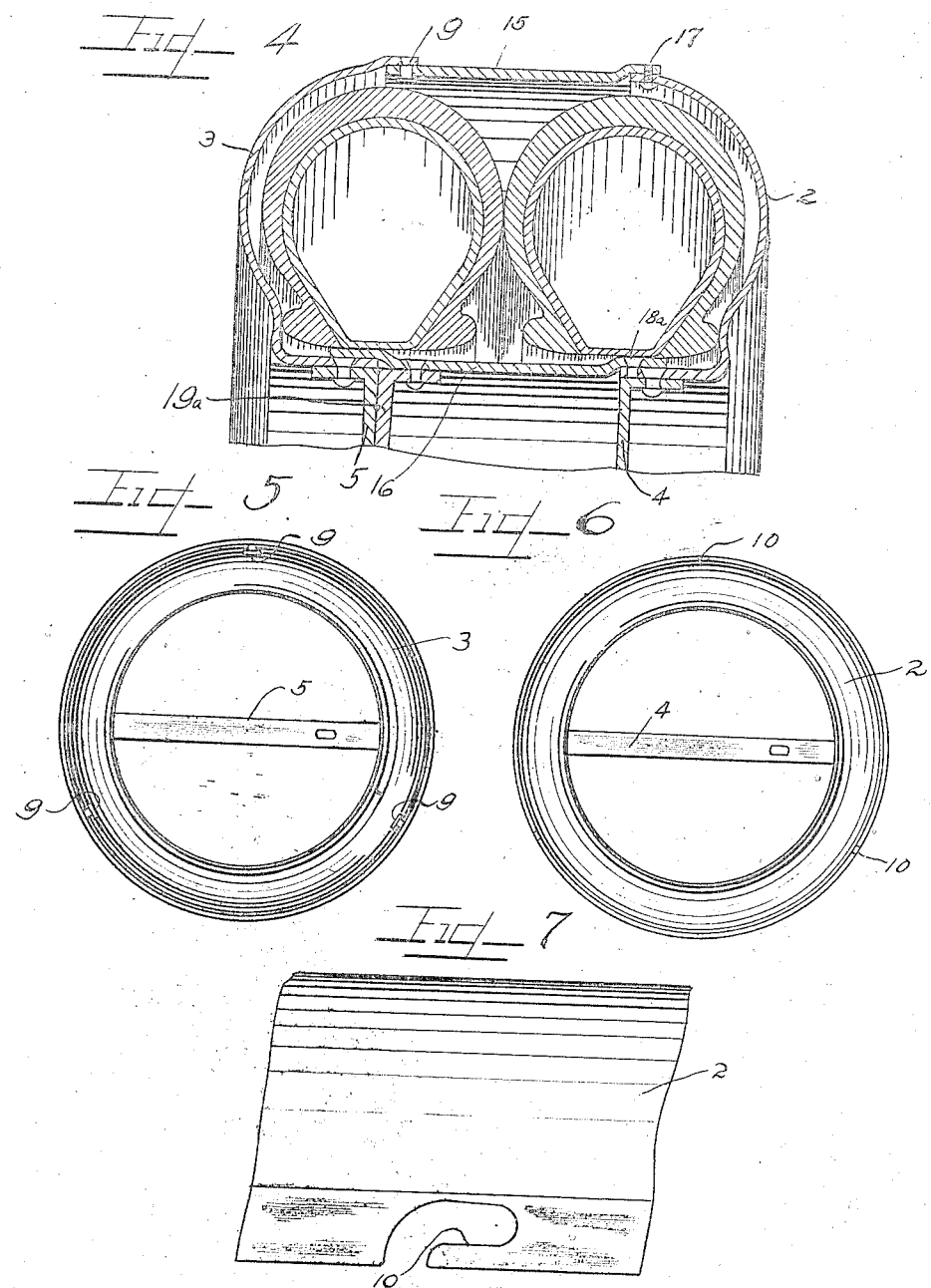

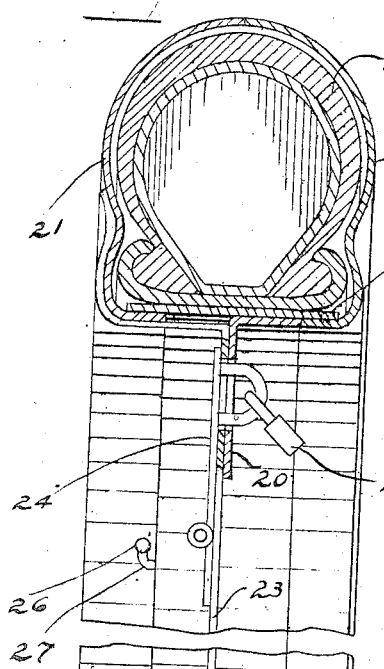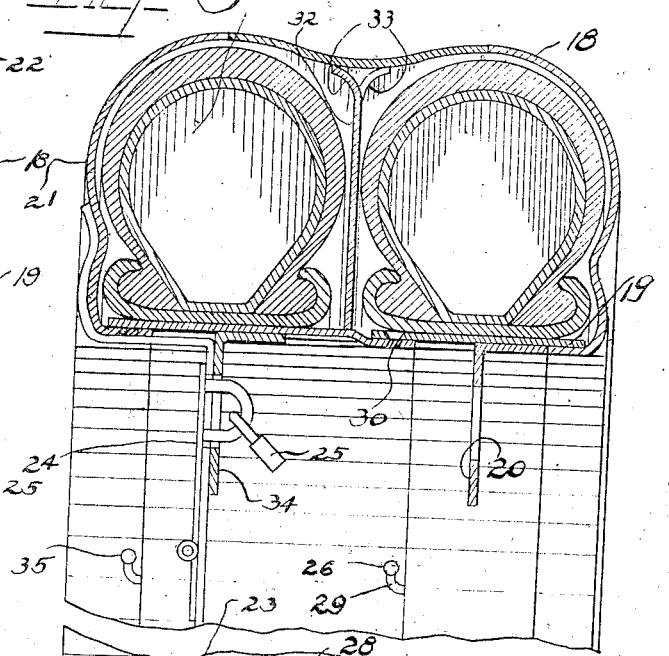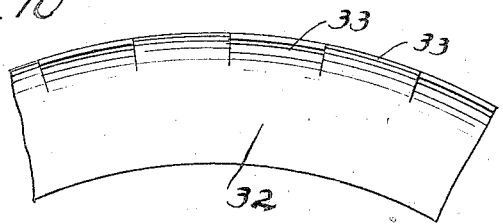

UNITED STATES PATENT OFFICE.

WALTER R. GREEN, OF CHICAGO, ILLINOIS.

TIRE-CARRIER.

1,375,753.                    Specification of Letters Patent.     Patented Apr. 26, 1921.

Application filed July 7, 1919. Serial No. 308,960.

*To all whom it may concern:*

Be it known that I, WALTER R. GREEN, a citizen of the United States, and a resident of the city of Chicago, in the county of Cook and State of Illinois, have invented certain new and useful Improvements in Tire-Carriers; and I do hereby declare that the following is a full, clear, and exact description of the same, reference being had to the accompanying drawings, and to the numerals of reference marked thereon, which form a part of this specification.

This invention relates to an improved form of tire carrier which may be readily changed by insertion of spacing elements, from a single tire carrier to one adapted to carry two or more tires depending upon the size of tires and spacing elements used. This tire carrier is of the inclosed type wherein the tires are entirely incased and concealed from view, and is of annular shape affording not only complete protection to the tires but as well forming an ornamental carrier for attachment upon a motor car or other vehicle.

It is an object of this invention to construct a tire carrier consisting of detachable sections when assembled forming a completely inclosed casing for tires and by the insertion of extra spacing elements adapted to be increased in size and for one, two, or more tires without necessitating change in the attaching devices by which the same is connected upon vehicle.

It is also an object of this invention to construct a tire carrier consisting of comtplemental annular members with one thereof releasably attached to the other by rotational adjustment and with means registering between said elements whereby the same may be locked together against adjustment or detachment when in proper associated relation.

It is also an object of this invention to provide a tire carrier comprising complemental annular elements adapted to be releasably associated with one another to form a complete inclosure for the tire to carry the same, and said elements adapted to receive circular members therebetween to increase the capacity of the device to carry one or more tires as desired.

It is finally an object of this invention to construct a tire carrier of ring form in which one or more tires may be carried properly inclosed and carried and with a detachable ring element forming a part thereof readily releasable from the assembly by a rotational adjustment from the assembly to give access to the case for insertion or removal of a tire.

Other and further important objects of this invention will be apparent from the disclosures in the drawings and specification.

The invention (in a preferred form) is illustrated in the drawings and thereinafter more fully described.

*Drawings.*

Figure 1 is a rear elevation of a motor car equipped with a tire carrier embodying the principles set forth in my invention.

Fig. 2 is a horizontal section with parts in elevation taken on line 2—2 of Fig. 1.

Fig. 3 is a similar section of a modified form of the device illustrating spacing elements inserted into the assembly.

Fig. 4 is an enlarged detail section taken through the form of device shown in Fig. 3 and illustrating in section a pair of tires carried therein.

Fig. 5 is an interior elevation of the removable annular element of the assembly shown in Fig. 3 taken along line 5—5 of Fig. 3.

Fig. 6 is a similar interior view of the complemental element taken along line 6—6 of Fig. 3.

Fig. 7 is an enlarged detail illustrating one of the bayonet slots in the periphery of one of the detachable elements or the stationary element of the tire carrier, affording part of the means of the connection of the removable element thereto.

Fig. 8 is a view similar to Fig. 2 of a modified form of device.

Fig. 9 is a similar view showing the casing enlarged to double capacity.

Fig. 10 is a fragmentary elevation of the inner spacer member of the structure shown in Fig. 9.

*Description.*

The reference numeral 1 indicates a motor car, and secured thereon in any suitable manner is a tire carrier of annular or ring form, comprising an inner fixed or stationary inwardly concave and outwardly convex element 2, and a complemental member 3 fitted thereto to form a completely closed annular casing. The inner annular member 2 is braced by a diametrically disposed brace bar 4 and similarly the other detachable complemental member 3 is provided with another brace bar 5 which, when the respective elements 2 and 3 are associated in proper relation, registers with the brace bar 4.

Said latter brace bar 5 is provided with a hinged hasp 6 having a U-bolt 7 secured thereto adapted to project through a registering aperture in the brace bar 4 shown in Fig. 2 whereby the respective casing sections may be locked to one another after rotational adjustment for their assembly.

A pin and bayonet slot connection is provided at several points along the outer periphery of the associated complemental members 2 and 3 as shown in detail in Figs. 5, 6, and 7. That is the outer complemental member or section 3 is provided with three equi-distantly spaced pins 9 secured thereon to project inwardly and the stationary complemental member or section 2 is provided with three bayonet slots 10, each adapted to receive one of said pins 9 when the complemental member is placed in register and given a slight rotation.

As clearly shown in Fig. 2 the assembled complemental member sections 2 and 3 form an annular compartment practically the same shape as the tire casing itself and the tire, whether mounted upon a demountable rim or not, may be inserted into the casing and completely inclosed, protected, and carried thereby. It will be noted that the inner portions of the sections 2 and 3 as shown in Fig. 2, are substantially flat and these flat walls form an easy means of attachment thereto of the brace bars 4 and 5 respectively. For this purpose the respective brace bars are angled at their ends, the ends of the brace bar 4 denoted by the reference numerals 11 is secured by rivets 12 and similarly the brace bar 5 is angled as denoted by the reference numerals 13, and secured by rivets 14, to the casing section.

When it is desired to increase the size of the carrier to increase the carrying capacity thereof it is only necessary to attach two spacing elements of cylindrical or ring shape as shown clearly in Figs. 3 and 4. The outer cylindrical element is denoted by the reference numeral 15 and the inner cylindrical element by the reference numeral 16. The outer cylindrical element 15 as shown clearly in Fig. 4 is attached to the stationary casing section 2 by means of screws 17 which are attached in place from the interior side of the assembly and similarly the inner cylindrical member 16 is held attached by means of screws 18ᵃ.

The outer margin of the spacing member 15 is provided with bayonet slots similar to the bayonet slots 10 so that the detachable casing section member 3 may be attached thereto in the same manner as to stationary section 2. In attachment of the casing section 3, the outer margin thereof overlaps the member 15 the same as when attached directly to the stationary section 2. The margins of the inner cylindrical member 16 are bent outwardly, so that the inner margin of the casing section 2 engages therewithin as shown in Fig. 4.

The inner cylindrical member 16 is also provided with a diametrically disposed brace bar 19ᵃ, shown on Figs. 3 and 4, provided with an aperture to receive the U-bolt 7 therethrough when the brace bar 5 is registered with the brace bar 19ᵃ in the same manner as it was registered with the brace bar 4 of the single tire assembly. In the modified forms shown in Figs. 8, 9, and 10 I have shown a circular fixed member 18, with an inner ring 19 and an angled apertured bracket 20 secured on the inner periphery of the ring. A complemental detachable circular member 21, is provided adapted to abut said section 18, engaging inwardly of the ring 19 to form a closed compartment for a tire 22. Said member or section 21 is provided with a cross bar 23 having a hinged hasp 24 adapted to engage the apertured bracket 20 to receive a padlock 25. The ring 19 is provided with pins 26 to engage with bayonet slots 27 in the section 21.

In Figs. 9 and 10 I have shown the fixed section 18 provided with an inner spacer ring 28 attached by bayonet slots 29 to the pins 26 and also by a screw 30 to prevent accidental rotational adjustment thereof. An outer spacer ring 31 is also provided dished inwardly and reinforced by a partition ring 32 having oppositely turned or bent portions 33 on its outer periphery which may preferably be brazed to the ring 31. Said inner spacer ring 28 has a lock bracket 34 and pins 35 for coaction with the section 21, as before described.

*Operation.*

This inclosed type of tire carrier is exceedingly simple in construction and is composed entirely of stamped elements. The bayonet slots upon the stationary element 2 permit attachment of the detachable section 3 thereto merely by placing the section 3 in registering position thereon to bring the pins 9 into the slots 10 and imparting a rotational adjustment to the section 3 to lock the pins in the slots of stationary section. This rotational adjustment brings the brace bar 5 of section 3 into register with the brace bar 4 of stationary section 2 and the hasp 6—7 is then projected through the apertured brace bar 4, and the padlock 8 attached, so that the respective associated sections cannot be rotated for an adjustment to separate the two.

In the modified form of device shown in

Figs. 3 and 4 it is clear that the capacity of the tire carrier may be changed merely by the insertion of cylindrical spacing elements 15 and 16 respectively which are attached to the stationary section 2 by screws inserted into place from the interior of the assembly so as to be inaccessible for unauthorized removal from the exterior of the assembly after the carrier is locked and closed by the removable section 3. The section 3 coacts with the enlarged carrier in the same manner as before, that is the pins 9 engage the bayonet slots which are provided in the cylindrical member 15. The brace bar 5 of the removable section registers with the brace bar of member 16 in the same manner as before and may be locked thereto to prevent rotational adjustment of the movable section. The modified forms of Figs. 8 and 9 differ only in details from those of the other figures and the underlying principles involved are substantially the same.

I am aware that numerous details of construction may be varied through a wide range without departing from the principles of this invention, and I therefore do not purpose limiting the patent granted otherwise than necessitated by the prior art.

I claim as my invention:

1. A tire carrier casing comprising complemental associated members to interfit with one another to form an annular tire casing and inner and outer spacing elements adapted to be attached therebetween effecting enlargement of the tire carrier.

2. A tire carrier comprising complemental sections adapted to be connected to one another to form an inclosed compartment for a single tire and spacing elements adapted to be attached to one of said sections and to receive the other section attached thereto in the same manner as to the first mentioned section to increase the tire capacity of the carrier.

3. In a tire holder, a pair of annular casing sections having interfitting parts adapted to bring said sections into operative relation by relative rotational movement thereof, members within the circumference of said sections adapted to be brought into alinement by said rotational movement, and means coöperating therewith to securely lock said sections together.

4. In a tire carrier, a plurality of complemental annular sections having interfitting parts adapted to operatively secure said sections together by relative rotational movement thereof, stiffening braces secured in said sections, and means coöperating with said braces to securely lock said sections together.

5. In a tire carrier, a pair of annular complemental sections having interfitting parts adapted to operatively secure said sections together by relative rotational movement thereof, braces in said sections adapted to be brought into alinement by said rotational movement, and means coöperating therewith for securely locking said sections together.

6. A tire carrier comprising a pair of annular complemental sections, an external cylindrical member secured to one of said sections and removably secured to the other section, an inner cylindrical member secured to one of said sections, and a brace in each section and inner cylindrical member, the section removably secured to said outer cylindrical member having its inner end supported by said brace and overlapped by said inner cylindrical member.

7. A tire carrier comprising an annular section, cylindrical extension members secured to the outer and inner edges thereof, a second annular section removably secured to the outer cylindrical member, braces in said last mentioned section and cylindrical member for locking said sections together.

8. A tire carrier comprising an annular section, cylindrical extension members secured to the inner and outer edges thereof, a second annular section, a brace connecting inner diametrical points of said second section, said second section being removably secured to the outer extension member and fitting within the inner cylindrical member.

9. A tire carrier comprising an annular section, cylindrical extension members secured to the inner and outer edges thereof, a second annular section, a brace connecting inner diametrical points of said second section, said second section being removably secured to the outer extension member and fitting within the inner cylindrical member, and means coöperating with said brace for locking the parts together.

10. A tire carrier comprising complemental members interfitting with one another to form an annular tire casing, inner and outer cylindrical spacing elements adapted to be attached therebetween effecting enlargement of the tire carrier, and means for removably securing one of said complemental members to said spacing elements.

11. In a tire carrier, an annular member having a diametrical brace, a second annular member having a diametrical brace, inner and outer spacing elements secured between said members, said inner member having a diametrical brace adapted to be brought in alinement with a brace in one of said sections, and means for locking said alined braces together.

12. A tire carrier comprising a pair of annular complemental members, inner and outer spacing elements secured to one of said members, means for rotatably interlocking the second member with one of said spacing elements, and means secured to said second member and the other of said spacing elements for locking said members together.

In testimony whereof I have hereunto subscribed my name in the presence of two subscribing witnesses.

WALTER R. GREEN.

Witnesses:
CHARLES W. HILLS, Jr.,
EARL M. HARDINE.